United States Patent [19]
Wells et al.

[11] Patent Number: 5,218,648
[45] Date of Patent: Jun. 8, 1993

[54] CONSTELLATION MATCHING SYSTEM AND METHOD

[75] Inventors: John D. Wells, Agoura; Cornelia R. Davis, Simi Valley, both of Calif.

[73] Assignee: Hughes Aircraft Company, Los Angeles, Calif.

[21] Appl. No.: 628,963

[22] Filed: Dec. 17, 1990

[51] Int. Cl.$^5$ ............................................. G06K 9/00
[52] U.S. Cl. ......................................... 382/34; 342/64; 382/1; 382/18
[58] Field of Search ................ 382/34, 18, 30, 1, 18, 382/50; 340/146.2; 342/64, 62; 364/443, 456, 460

[56] References Cited

U.S. PATENT DOCUMENTS

| | | | |
|---|---|---|---|
| 4,736,437 | 4/1988 | Sacks | 382/34 |
| 5,086,480 | 2/1992 | Sexton | 382/34 |

Primary Examiner—Leo H. Boudreau
Attorney, Agent, or Firm—Charles D. Brown; Randall M. Heald; Wanda K. Denson-Low

[57] ABSTRACT

A system (10) and method for matching a set of detected points (26) to a reference constellation (20). A programmable processor (14) receives detected coordinate locations from a sensor (16) and reference coordinate locations from a reference storage device (12). The processor (14) performs a coordinate transformation from the reference coordinate frame to the detected coordinate frame and contructs a table of possible matches. Potential matches are found from the possible matches which have their difference vectors below a predefined threshold. These possible matches are then placed in a match matrix histogram (30) which is further refined to eliminate all but the best matches. The final matching then may be used to find a particular aimpoint (24) in the detected constellation (26).

15 Claims, 17 Drawing Sheets

N REFERENCE POINTS

M DETECTED POINTS

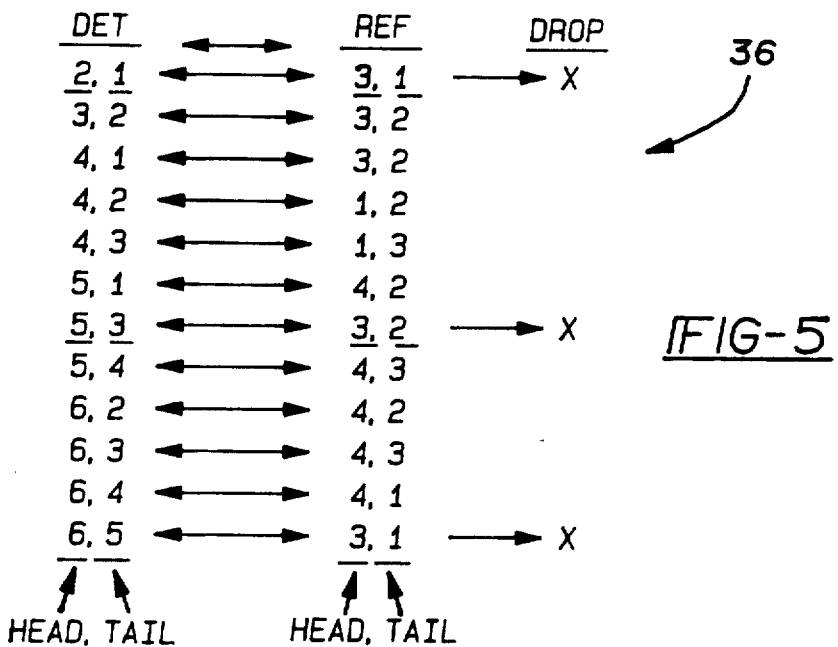
FIG-5
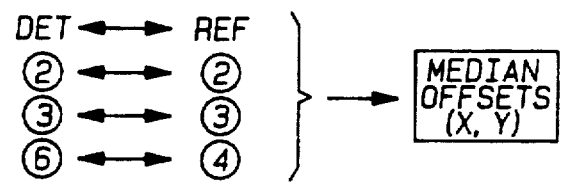
FIG-7
CHECK ALL ROW MAX "MATCHES" FOR
CONSISTENCY USING MEDIAN OFFSETS
| DET | REF | KEEP | | DET | REF | KEEP |
|---|---|---|---|---|---|---|
| ① | ② | NO | | ④ | ① | YES |
| ② | ② | YES | | ⑤ | ④ | NO |
| ③ | ③ | YES | | ⑥ | ④ | YES |
FIG-8

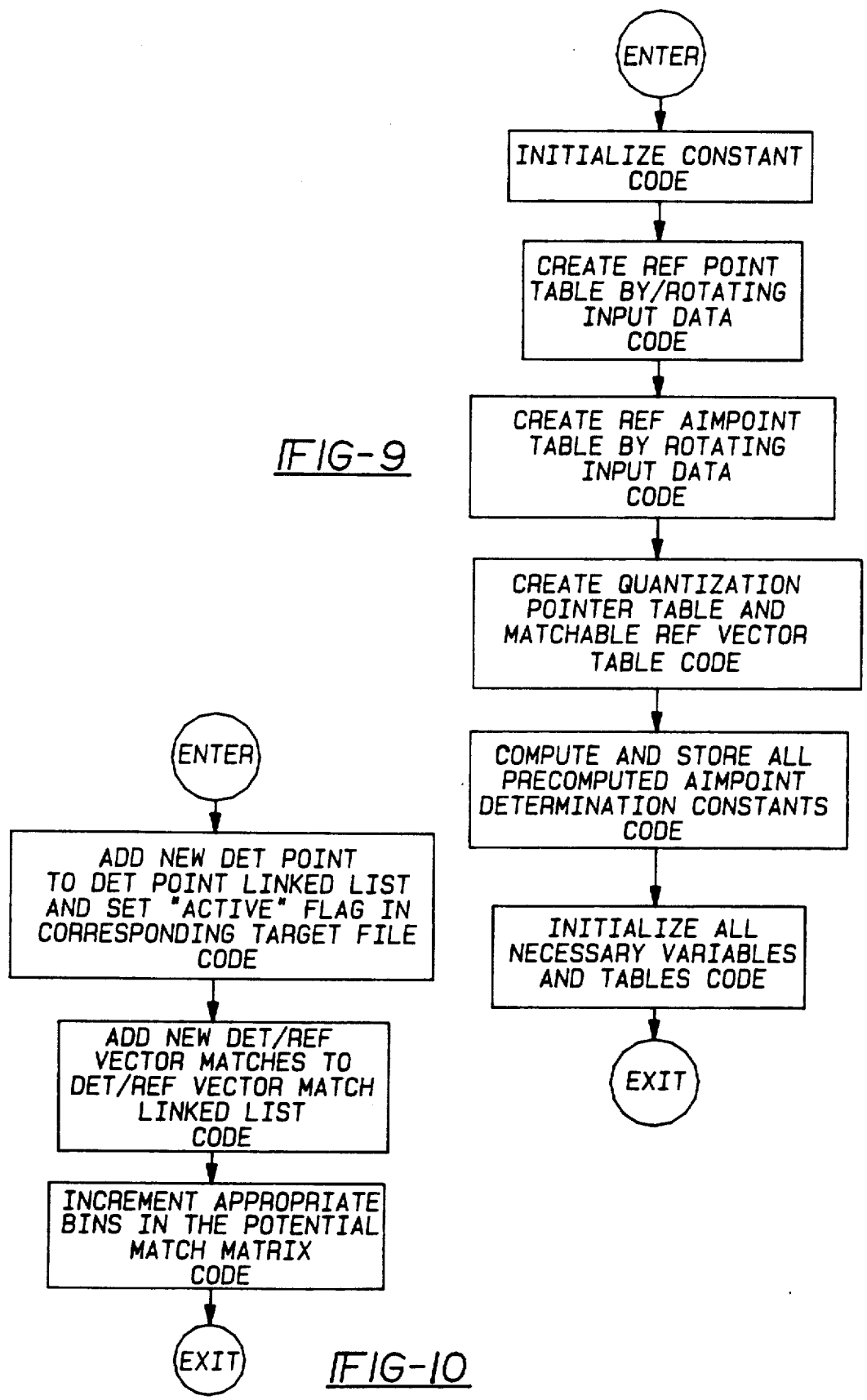

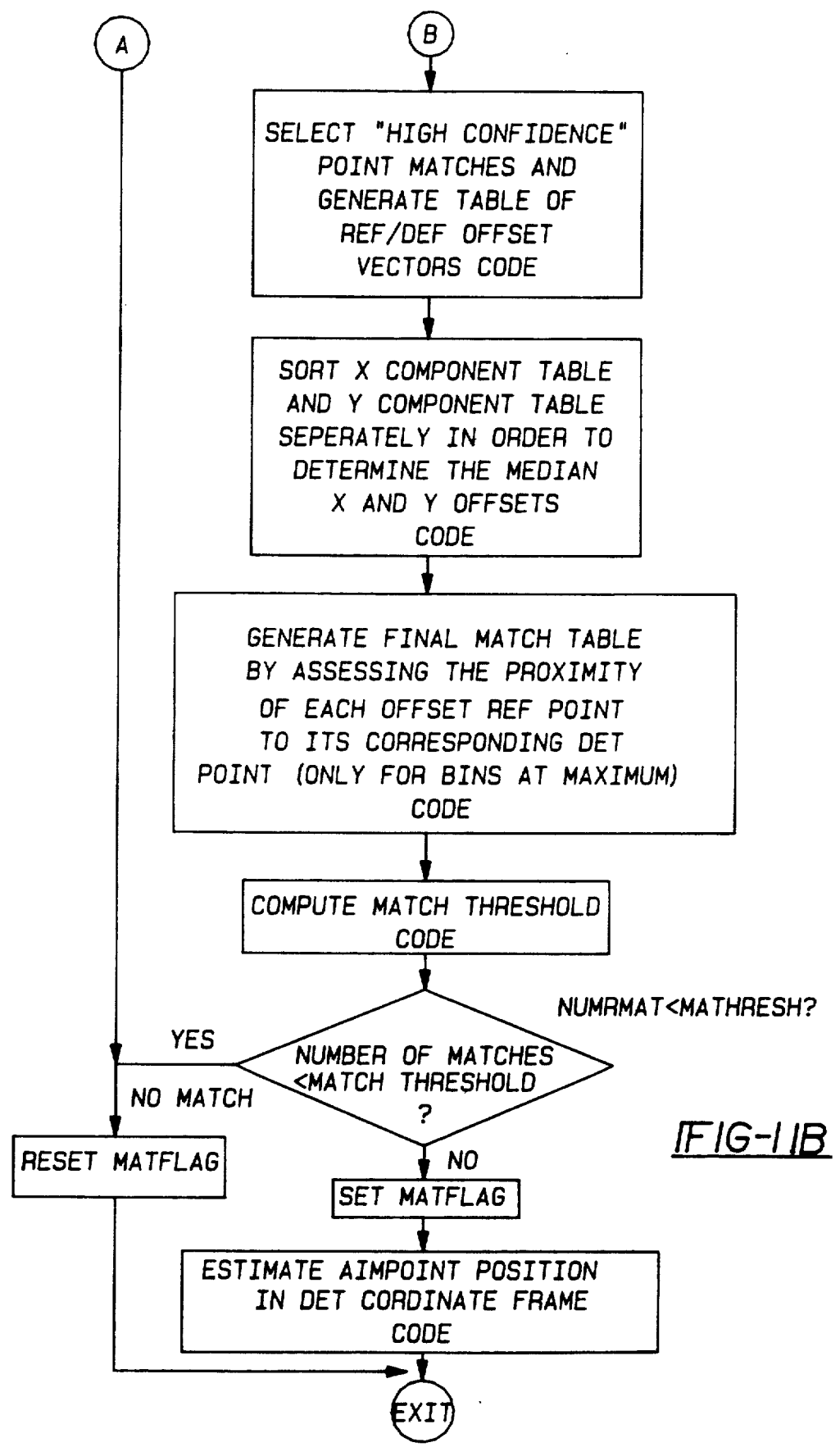

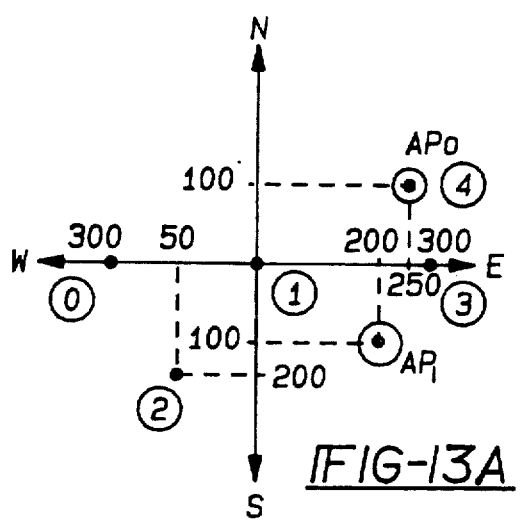
*FIG-13A*
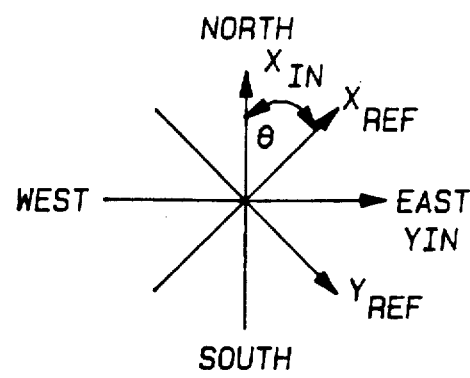
*FIG-13B*
INPUT REF POINT TABLE
|   | XRIN | YRIN |
|---|------|------|
| 0 | 0    | -300 |
| 1 | 0    | 0    |
| 2 | -200 | -50  |
| 3 | 0    | 300  |
| 4 | 100  | 250  |
|   |      |      |
|   | ⋮    | ⋮    |
|   |      |      |
NRPTS=5
*FIG-14*
REFERENCE POINT TABLE
|   | XREF | YREF |
|---|------|------|
| 0 | -300 | 0    |
| 1 | 0    | 0    |
| 2 | -50  | 200  |
| 3 | 300  | 0    |
| 4 | 250  | -100 |
|   |      |      |
|   | ⋮    | ⋮    |
|   |      |      |
*FIG-15*
INPUT REF AIMPOINT TABLE
| APIDX | XAPIN | YAPIN |
|-------|-------|-------|
| 4     |       |       |
| -1    | -100  | 200   |
|       |       |       |
| ⋮     | ⋮     | ⋮     |
|       |       |       |
NAPS=2
*FIG-16*
REFERENCE AIMPOINT TABLE
|   | XAPREF | YAPREF |
|---|--------|--------|
| 0 | 250    | -100   |
| 1 | 200    | 100    |
|   |        |        |
|   | ⋮      | ⋮      |
|   |        |        |
*FIG-17*

CONSTRAINTS $$\begin{cases} N_x * \delta_x \geq DX+W \\ N_y * \delta_y \geq 2*DY \end{cases} \text{COMPLETE COVERAGE}$$

$$\begin{cases} \delta_x, \delta_y \\ N_x, N_y \end{cases} = \text{POWERS OF 2 INTERNALLY} \Big\} \text{IMPLEMENT INDEXING WITH SHIFTS}$$

$$\{\delta_x \approx \delta_y\} \text{ UINFORM SPATIAL QUANTIZATION}$$

$$\begin{cases} X_{OFF} \geq W \\ Y_{OFF} \geq DY \end{cases} \text{NON-NEGATIVE INDEXING}$$

⇓

$$I = INT\left[\frac{X + X_{OFF}}{\delta_x}\right] \leftarrow X \text{ INDEX}$$

$$J = INT\left[\frac{Y + Y_{OFF}}{\delta_y}\right] \leftarrow Y \text{ INDEX}$$

$$K = N_Y * I + J \leftarrow \text{COMBINED TABLE INDEX}$$

USE: $X_{OFF} = XVCUTOFF \geq W$
$Y_{OFF} = DETWIDTH = DY$ (X,Y) OF REF VECTORS WHICH MIGHT MATCH K TH BIN (I,J)

$$\Rightarrow \begin{cases} \delta_x \cdot I - X_{OFF} - LIM \leq x < \delta_x \cdot (I+1) - X_{OFF} + LIM \\ \delta_y \cdot J - Y_{OFF} - LIM \leq y < \delta_y \cdot (J+1) - Y_{OFF} + LIM \end{cases}$$

FIG-18B

REFERENCE VECTOR TABLE

| RPVHEAD | RPVTAIL | XRVECT | YRVECT | |
|---|---|---|---|---|
| 1 | 0 | 300 | 0 | 0 |
| 1 | 2 | 50 | -200 | 1 |
| 2 | 0 | 250 | 200 | 2 |
| 2 | 1 | -50 | 200 | 3 |
| 3 | 0 | 600 | 0 | 4 |
| 3 | 1 | 300 | 0 | 5 |
| 3 | 2 | 350 | -200 | 6 |
| 3 | 4 | 50 | 100 | 7 |
| 4 | 0 | 550 | -100 | 8 |
| 4 | 1 | 250 | -100 | 9 |
| 4 | 2 | 300 | -300 | 10 |
| 4 | 3 | -50 | -100 | 11 |
| | | | | |
| ⋮ | ⋮ | ⋮ | ⋮ | |

NRVECT=12

*FIG-19*

QUANTIATION POINTER TABLE $(I, J) \Rightarrow 4I+J$

| | QTABLEN | QTABPTR |
|---|---|---|
| (0, 0) =>0 | 0 | |
| (0, 1) =>1 | 7 | 0 |
| (0, 2) =>2 | 5 | 7 |
| (0, 3) =>3 | 0 | |
| (1, 0) =>4 | 0 | |
| (1, 1) =>5 | 2 | 12 |
| (1, 2) =>6 | 1 | 14 |
| (1, 3) =>7 | 0 | |

NQBINS=8

MATCHABLE REF VECTORS TABLE

| | RVPMIDX |
|---|---|
| 0 | 0 |
| 1 | 1 |
| 2 | 5 |
| 3 | 6 |
| 4 | 9 |
| 5 | 10 |
| 6 | 11 |
| 7 | 0 |
| 8 | 2 |
| 9 | 3 |
| 10 | 5 |
| 11 | 7 |
| 12 | 4 |
| 13 | 8 |
| 14 | 4 |
| ⋮ | ⋮ |

NMRVTAB=15

*FIG-20*

DETECTION POINTS LINKED LIST

| | DPLNEXT | DPLPREV | DETTGT | XDET | YDET | |
|---|---|---|---|---|---|---|
| 0 | 1 | -1 | 0 | 200 | 100 | R0 |
| 1 | 2 | 0 | 1 | 450 | 300 | R2 |
| 2 | 3 | 1 | 2 | 500 | 100 | R1 |
| 3 | 4 | 2 | 3 | 600 | 200 | ∅ |
| 4 | 5 | 3 | 4 | 750 | 0 | R4 |
| 5 | -1 | 4 | 5 | 800 | 100 | R3 |
| 6 | | | | | | |
| 7 | | | | | | |

↑ CORRESPONDENCE TO REF POINT

DPLBEG=0   DPLEND=5
NDPTS=6

*FIG-21*

DET/REF VECTOR MATCH LINKED LIST

| | DRVLNEXT | DRVLPREV | BIDXHEAD | BIDXTAIL |
|---|---|---|---|---|
| 0 | 1 | -1 | 10 | 0 |
| 1 | 2 | 0 | 17 | 0 |
| 2 | 3 | 1 | 19 | 1 |
| 3 | 4 | 2 | 17 | 10 |
| 4 | 5 | 3 | 27 | 20 |
| 5 | 6 | 4 | 36 | 0 |
| 6 | 7 | 5 | 36 | 10 |
| 7 | 8 | 6 | 36 | 17 |
| 8 | 9 | 7 | 43 | 0 |
| 9 | 10 | 8 | 43 | 10 |
| 10 | 11 | 9 | 41 | 16 |
| 11 | 12 | 10 | 43 | 17 |
| 12 | 13 | 11 | 44 | 25 |
| 13 | -1 | 12 | 43 | 36 |
| | ⋮ | ⋮ | ⋮ | ⋮ |

NDRVMATS=14

NREFMAX=8 => BIDX=8 DET+REF

*FIG-22*

POTENTIAL MATCH MATRIX

| | 0 | 1 | 2 | 3 | 4 | 5 | 6 | 7 |
|---|---|---|---|---|---|---|---|---|
| | MATBIN(K) WHERE K=8 DET+REF | | | | | | | |
| 0 | 0 \|\|\|\| | 1 \| | 2 | 3 | 4 | 5 | 6 | 7 |
| 1 | 8 | 9 | 10 \|\|\|\| | 11 | 12 | 13 | 14 | 15 |
| 2 | 16 \| | 17 \|\|\|\| | 18 | 19 \| | 20 \| | 21 | 22 | 23 |
| 3 | 24 | 25 \| | 26 | 27 \| | 28 | 29 | 30 | 31 |
| 4 | 32 | 33 | 34 | 35 | 36 \|\|\|\| | 37 | 38 | 39 |
| 5 | 40 \| | 41 | 42 | 43 \|\|\|\| | 44 \| | 45 | 46 | 47 |
| 6 | 48 | 49 | 50 | 51 | 52 | 53 | 54 | 55 |
| 7 | 56 | 57 | 58 | 59 | 60 | 61 | 62 | 63 |

DET (vertical axis), REF (horizontal axis 0–7)

BRTHRESH=.5*4 =2

BINMAX=4 => BINMAX>MXTHRESH

MXTHRESH=MAX {2, .75(.75*5-1)} =2.0625

FINAL POINT MATCH TABLE

| MDPIDX | MRPIDX | MDPX | MDPY |
|---|---|---|---|
| 0 | 0 | 200 | 100 |
| 1 | 2 | 450 | 300 |
| 2 | 1 | 500 | 100 |
| 4 | 4 | 750 | 0 |
| 5 | 3 | 800 | 100 |
| ... | ... | ... | ... |

NUMDMAT=5 (indices 0,1,2,3,4)

MATHRESH=MAX {.75*5*.75, 3} =3
=> MATFLAG=SET

| MATCH (D,R) | DET X | DET Y | OFFSET X | OFFSET REF Y | OK? |
|---|---|---|---|---|---|
| (0, 0) | 200 | 100 | 200 | 100 | YES |
| (1, 2) | 450 | 300 | 450 | 300 | YES |
| (2, 1) | 500 | 100 | 500 | 100 | YES |
| (4, 4) | 750 | 0 | 750 | 0 | YES |
| (5, 3) | 800 | 100 | 800 | 100 | YES |

FTDEST=10  KLOWFTD=5
MINTHR=3

ESTIMATE DET FRAME AIMPOINT TABLE

|  | XAPDET | YAPDET |
|---|---|---|
| 0 | 750 | 0 |
| 1 | 700 | 200 |

CONSTELLATION MATCHING SYSTEM AND METHOD

BACKGROUND OF THE INVENTION

1. Technical Field

This invention relates to systems and methods for pattern matching and, more particularly, to a system and method for matching a set of detected points to a set of reference points in real time.

2. Discussion

Pattern, or constellation, matching problems arise in a variety of settings. One example of a pattern matching problem is in radar seeker systems in which detected points in a scene form a known pattern or constellation of points. The problem then is to match a new set of detected points to the known constellation. Similar problems exist with infrared seeker systems and also in systems for recognizing patterns in visual images. In a typical pattern matching problem, a known pattern or set of points are established. An attempt is then made to match a new set of data to the reference pattern. One conventional approach to solving pattern matching problems involves complex scene recognition algorithms. These algorithms are typically very time consuming to develop, often require special processors, and may not be fast enough for real-time application. Other approaches to pattern matching use a human at some point in the loop. This creates problems in speed, reliability, etc.

Thus, it would be desirable to provide a system for constellation matching which can be implemented in real time. In addition, it would be desirable to have a pattern matcher which minimizes the amount of processing necessary and avoids the need for special purpose hardware. This would permit the use of conventional processors already installed in existing systems or vehicles.

SUMMARY OF THE INVENTION

Pursuant to the present invention, a system and method is provided for matching a set of detected points to a reference point pattern. This system includes a programmable processor for storing the coordinates of reference points from the reference pattern. These reference coordinates are defined in a reference frame. In addition, the processor stores the coordinates of the detected points. The detected coordinates are defined in a detected coordinate frame. Next, the points in the reference coordinate frame are transformed to the detected coordinate frame using an apriori coordinate transform. Vector tables of each possible ordered pair of reference points and detected points are then created. A list of pairs of matched reference and detected vectors is constructed. The criteria for matching vectors is that the magnitude of the difference vectors between pairs of reference and detected vectors is less than a predetermined threshold.

A match matrix histogram is then created which contains bins for counting each Detection—Reference point correspondence generated by relating the Heads and Tails of the matched Detection—Reference vector pairs. Finally, matches are selected in the matrix by eliminating less probable matches based upon the number of counts in the bins and the geometrical consistency of the implied point matches.

BRIEF DESCRIPTION OF THE DRAWINGS

The various advantages of the present invention will become apparent to one skilled in the art, by reading the following specification and by reference to the drawings in which:

FIG. 5 is a table of matched vectors in accordance with the present invention;

FIG. 7 is a diagram of the computation of median offsets in accordance with the present invention;

FIG. 8 is a diagram of the use of median offsets to check row MAX matches for consistency;

FIG. 9 is a flowchart of the initialization routine in accordance with the present invention;

FIG. 10 is a flowchart of the detection routine in accordance with the present invention;

FIG. 11A-B are flowcharts of the matching routine in accordance with the present invention;

FIG. 13A is a drawing of reference and detected points for the real-time example in accordance with the present invention;

FIG. 13B is a drawing of the coordinate system for transforming input frame to REF frame.

FIG. 14 is an input reference point table in accordance with the present invention;

FIG. 15 is a reference point table derived from the input reference point table in FIG. 14;

FIG. 16 is an input reference aimpoint table in accordance with the present invention;

FIG. 17 is a reference aimpoint table derived from the input reference aimpoint table of FIG. 16;

FIGS. 18A and 18B are a series of tables illustrating the Detection Point/Vector/Quantization Coordinate Definition;

FIG. 19 is a reference vector table in accordance with the present invention;

FIG. 20 is a quantization pointer table in accordance with the present invention;

FIG. 21 is a detection points linked list in accordance with the present invention;

FIG. 22 is a DET/REF vector match linked list in accordance with the present invention;

FIG. 23 is a potential match matrix in accordance with the present invention;

Figure 24:
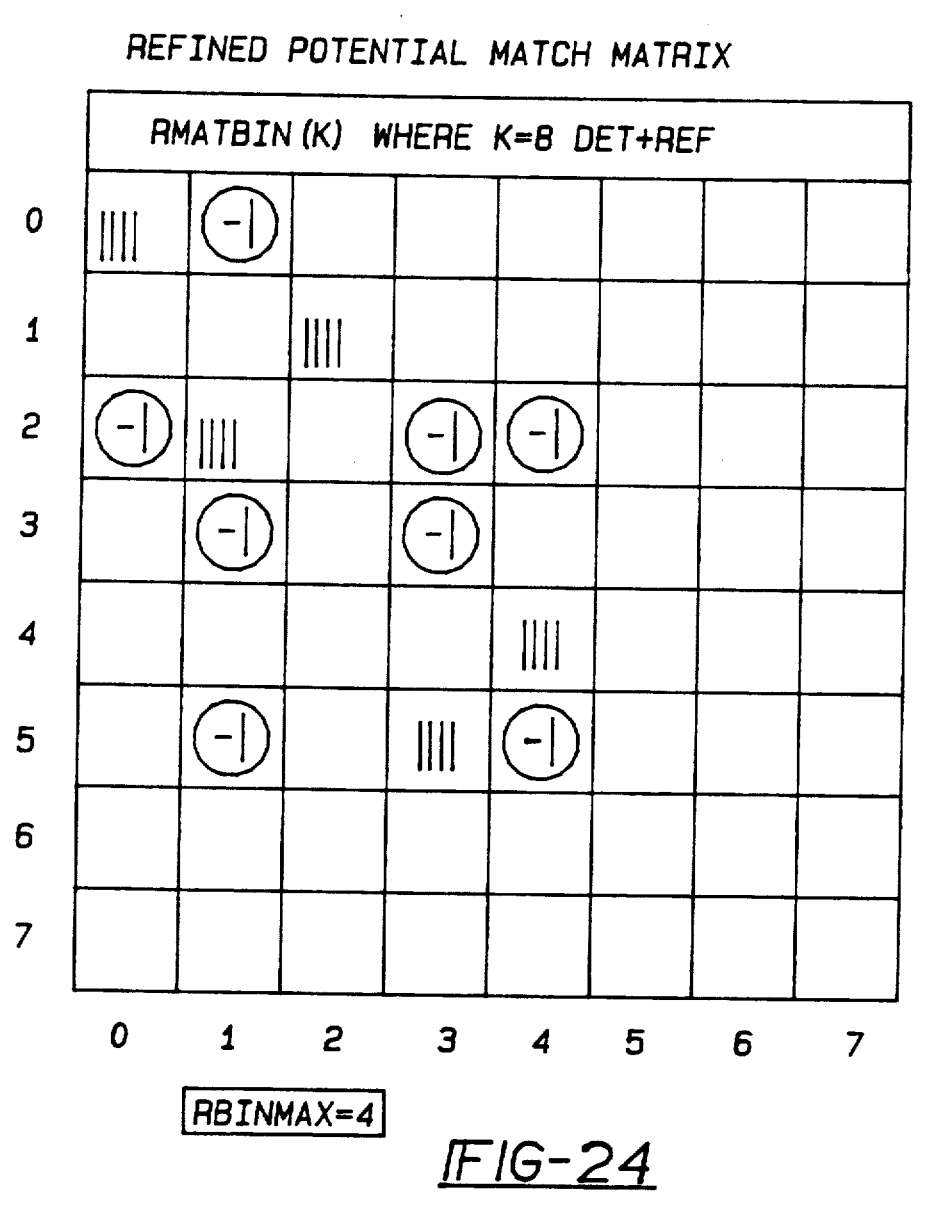

FIG. 24 is a refined potential match matrix derived from the potential match matrix in FIG. 23;

FIG. 26 shows a final point match table in accordance with the present invention; and FIG. 27 is an estimated DET frame aimpoint table in accordance with the present invention.

DESCRIPTION OF THE PREFERRED EMBODIMENT

Figure 1:
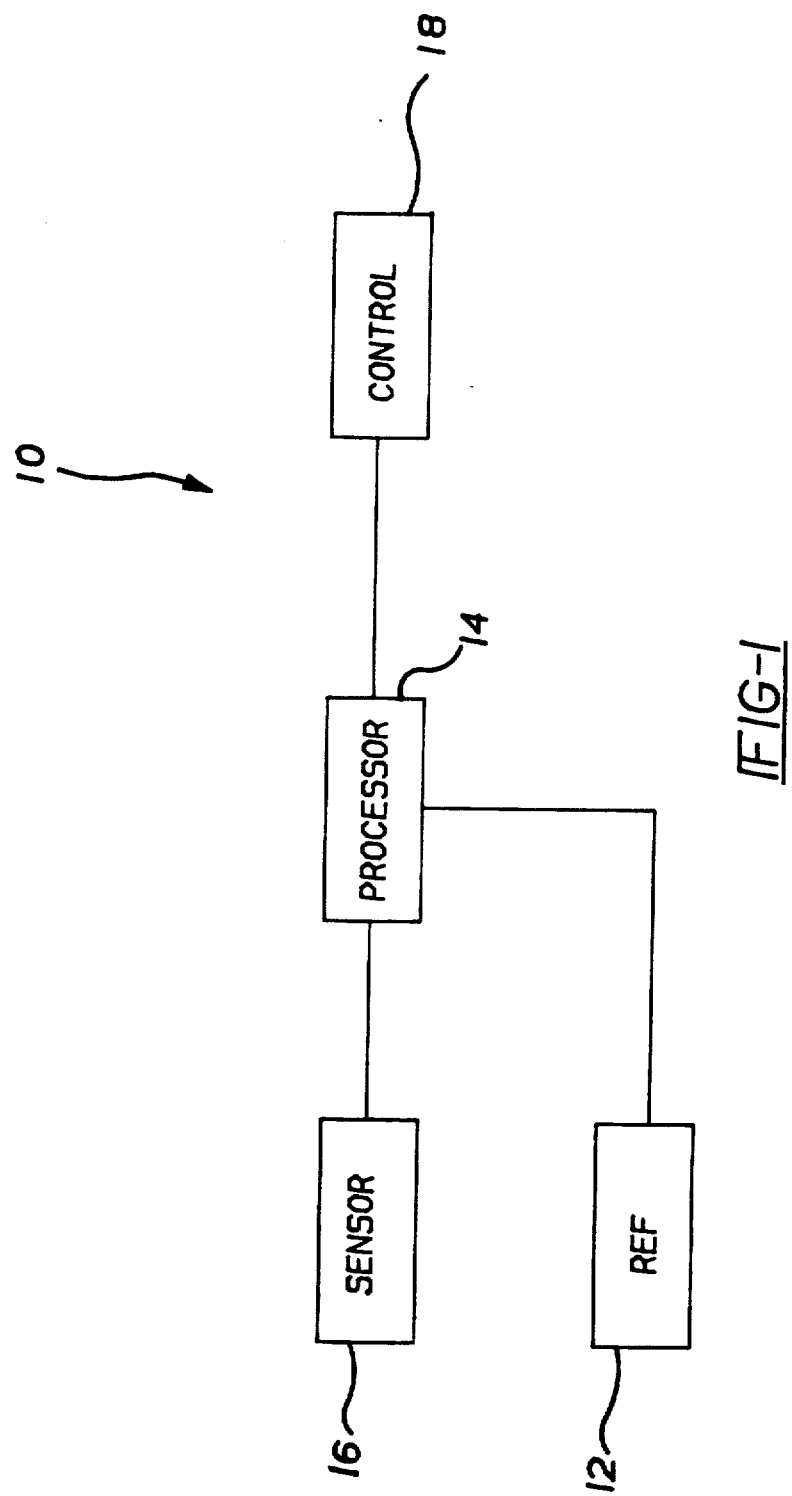
FIG. 1 is a block diagram of the overall constellation matching system in accordance with the present invention.

The basic function of the constellation matching system, in accordance with the present invention, is to locate a pattern of reference points within an image of detected points and then to use the correspondence information to locate a specific point or points of interest in the detection image. Referring now to FIG. 1, the overall scheme of the constellation matching system 10 is shown. A reference point storage means 12 contains coordinates for the reference points in a well defined coordinate system. In addition, the coordinates of the specific point of interest are also supplied to the reference point storage means 12. The coordinates of the reference points and the specific point (aimpoint) are transmitted to a constellation matching processor 14.

Overall, the general approach of the present invention is to proceed in four basic steps: Initialization, Detection, Matching and Update. During the Initialization period the constellation matching processor 14 will perform all computations that can be performed prior to the knowledge of the detection points. A sensor 16 will then provide coordinates of detected points (in a detection coordinate system) to the constellation matching processor 14. The sensor 16 may be gathering radar, IR, or other information to generate detected point coordinates.

All computations that can be made based on knowledge of a single detection point, will be made by the constellation matching processor 14 during an ongoing Detection period as time permits. Then all remaining computations based upon the entire detection image will be made during a periodic Matching period as detection points are sequentially added to the detection image. Next, purging of "extinct" detection point data and reinitialization will be performed after each unsuccessful matching attempt during an Update period. Once a final match has been derived by the constellation matching processor 14 the coordinates of the matched points will be used to determine the location of the specific aimpoint in the detected image. The coordinates of the aimpoint may then be transmitted to a control system 18 which may be, for example, a missile guidance system or other means of utilizing the aimpoint information.

While the present invention is useful in many general cases, the preferred embodiment, described below, will be presented for the case where the reference and detected images are two-dimensional and involve only minimal differences in viewing perspective (rotation and warping) or scaling. This a simple but useful model for many real situations.

1. Initialization

Figure 2:
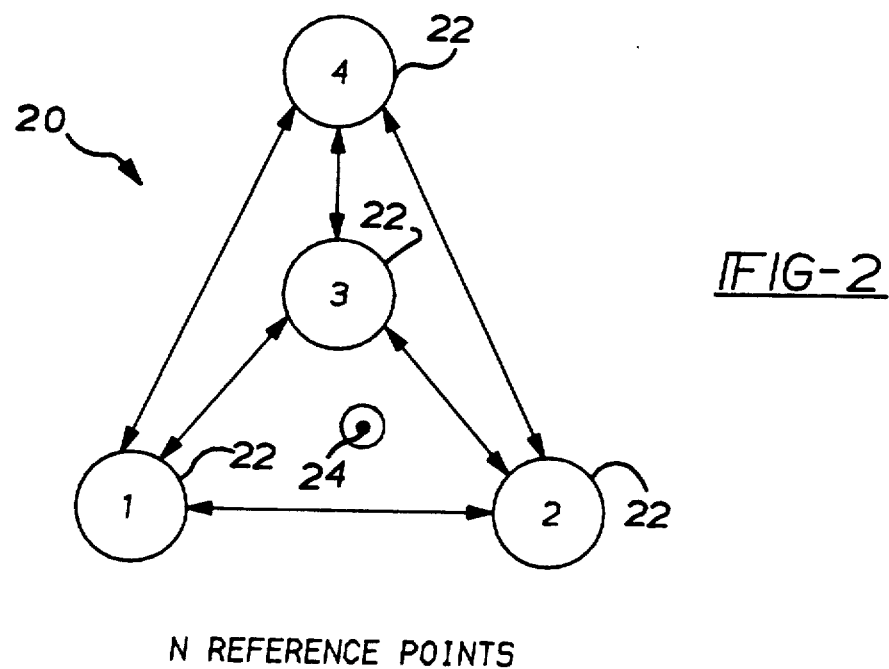
FIG. 2 is a diagram of a set of reference points forming a reference constellation.
Figure 3:
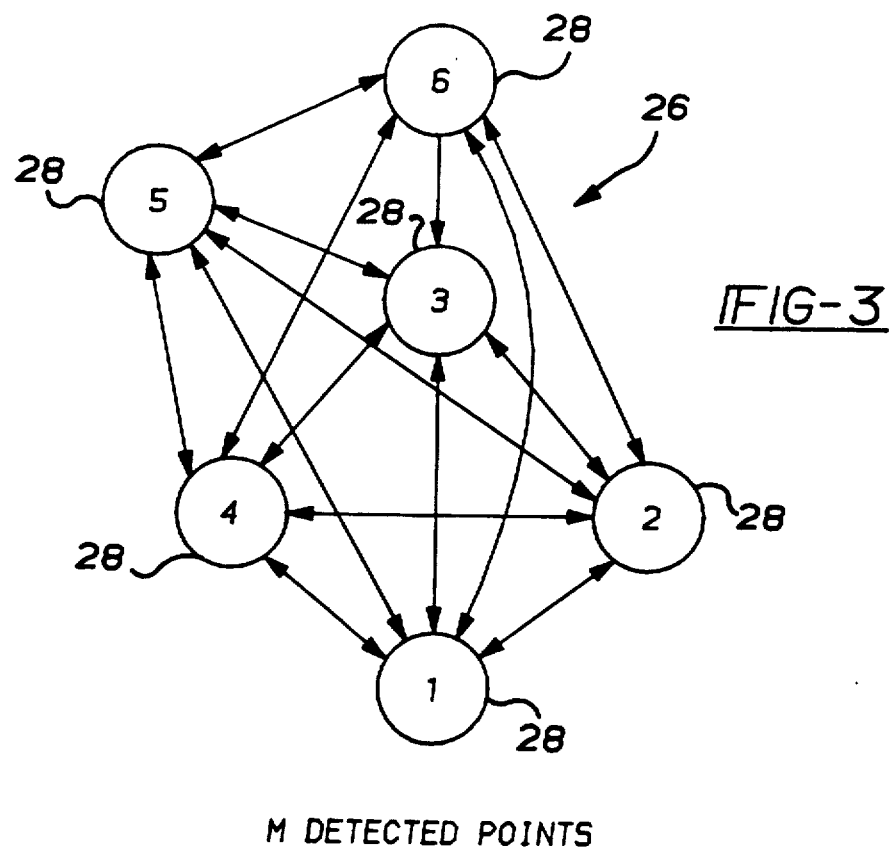
FIG. 3 is a diagram of a set of detected points to be matched with the reference points shown in FIG. 2.

Referring now to FIG. 2, a simple constellation 20 consisting of four reference points 22 is shown. An aim point 24 is located in a given, fixed, known location with respect to the orientation of the constellation 20. Coordinates for each of the points 22 and as well as the aimpoint 24 are given in a particular reference coordinate system. FIG. 3 shows a set 26 of six detected points 28. The detected points 28 are defined by coordinates in a detected reference frame. An apriori encounter geometry is specified; thus, the angle of bearing of the detected coordinate frame is known with respect to the reference coordinate frame. An appropriate coordinate transformation is established and the supplied reference coordinates are converted to the apriori detection coordinate frame. These points are referred to as the REF coordinates of the reference points. A North, East orientation for X, Y with an arbitrary origin is used. Also, the apriori encounter bearing (angle relative to North) will set the internal X axis orientation.

Next, a set of vectors is established for each possible ordered pair of reference points. Vectors go from one point to another, and each point pair is nominally used twice. In order to improve throughput, "very long" vectors oriented predominantly "backward" may be eliminated since the corresponding detection vectors could not match them anyway due to the sequential manner in which they are formed. For example, REF vectors with a negative X component exceeding a predetermined magnitude need not be retained.

Next, the storage depth (along the X axis) required to encompass the reference image is computed and the "extinction" criteria are established for detection points. Then a potential match threshold is established which will define counts in a potential match histogram based upon the number of reference points supplied and the apriori probability of point detection.

Figure 4:
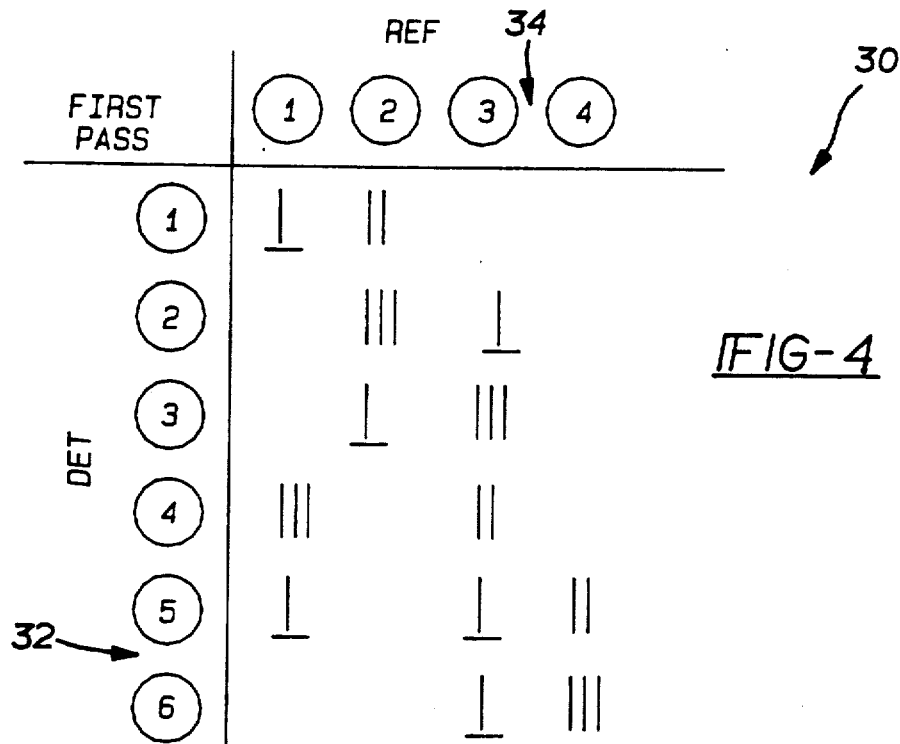
FIG. 4 is a first pass of a match matrix histogram utilized by the constellation matcher in FIG. 1.

Referring now to FIG. 4, a potential match matrix 30 is constructed with all of its bins set to 0. The rows 32 in the matrix correspond to detected (DET) points and columns 34 in the matrix 30 correspond to REF points. Other miscellaneous constants, tables and variables which require Initialization are established and initialized during this period. Also, data needed for aimpoint estimation which can be pre-computed for all outcomes of the matching process can be made and stored at this time.

2. Detection

As each new detection point is encountered, a new row 32 in the match matrix 30 is selected from a list of available free rows and the row is designated as "in use". A set of vectors are then established for each possible pair of detected points. Vectors go from each of the old "non-extinct" points to the new point. As each new set of DET vectors is generated, a vector match is attempted between each DET vector and each REF vector. A match between two vectors occurs when the length of their difference vector is less than a predetermined threshold. In order to reduce throughput, a preliminary screening of match attempts is accomplished using a look-up procedure. During the Initialization period, the DET vector space is partitioned into a predetermined number of rectangular regions. Then for each such region, a list of REF vectors which could possibly match any DET vector falling in that region is stored in a table. Then during the Detection period, only a small number of potential REF to DET vector matches need be attempted. Additionally, by testing X and Y separately with a slightly looser criteria and then only testing the length for the few potential matches surviving their initial screening, one can substantially reduce the required throughput. A list of current vector matches is augmented with the new matches.

Referring now to FIG. 5, this list 36 of vector matches is shown. To illustrate, the first entry in the list of vector matches indicates that the vector beginning at detected point 1 and ending with detected point 2 in FIG. 3 has been found to match with the vector beginning with reference point 1 and ending with reference point 3 shown in FIG. 2. From visual inspection it can be seen that these vectors are roughly the same length and direction.

Each vector match yields two corresponding point matches thus, the first entry in the vector match list 36 will yield a match between detected point number 2 and reference point number 3 and also between detected point number 1 and reference point number 1. The match matrix 30 in FIG. 4 will accordingly have its bins incremented to tabulate these results. Thus, a 1 appears at the intersection of the row for detected point number 2 and the column for reference point number 3. Also, a 1 is placed in the bin at the intersection of the row for detected point number 1 and the column for reference point number 1. In FIG. 4 the histogram matrix 30 shows the results of tabulating all matches found in the vector match table 36. It can be seen in the match matrix 30 that for certain detection and reference points there were no matches and that for some there were a maximum of three matches.

3. Matching

The match matrix 30 is now scanned to determine the maximum value contained (MAX). As discussed above, during the Initialization period, a potential match threshold was established. For example, as shown in FIG. 4, this threshold is established to be 2.25. Now, the MAX, which is equal to 3, is compared to the match threshold. If this MAX is less then the potential match threshold, then the matching process terminates for this attempt without finding the reference pattern. Otherwise a bin retention threshold is established and the process continues below. As shown in FIG. 4, the MAX is greater than the threshold and the bin retention threshold (REQ) is calculated as half the MAX, or 1.5.

Figure 6:
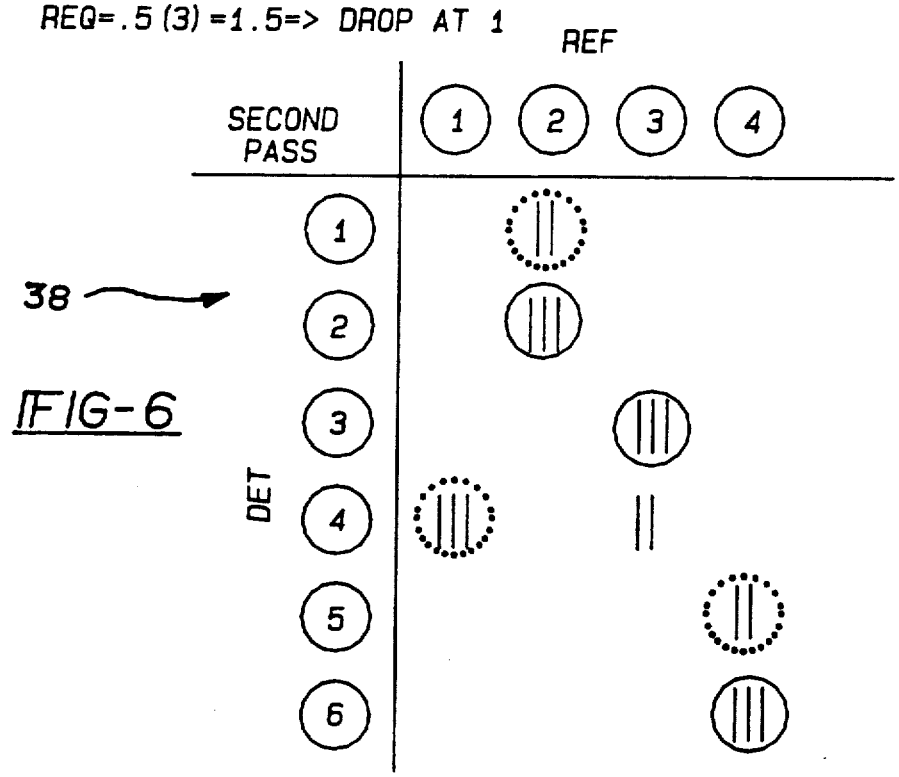
FIG. 6 is a refined version of the match matrix histogram shown in FIG. 4.
Figure 11A:
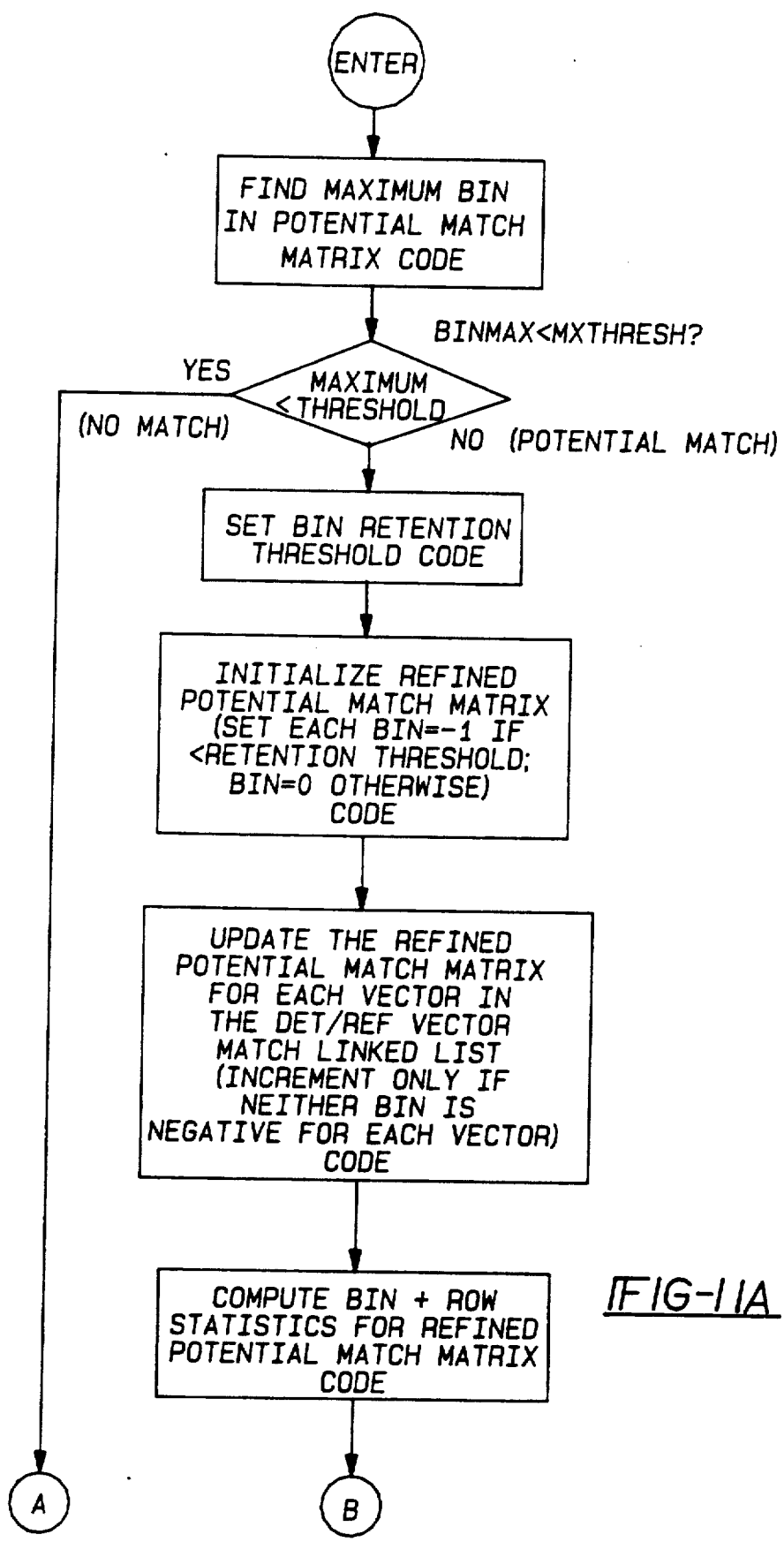
Figure 12:
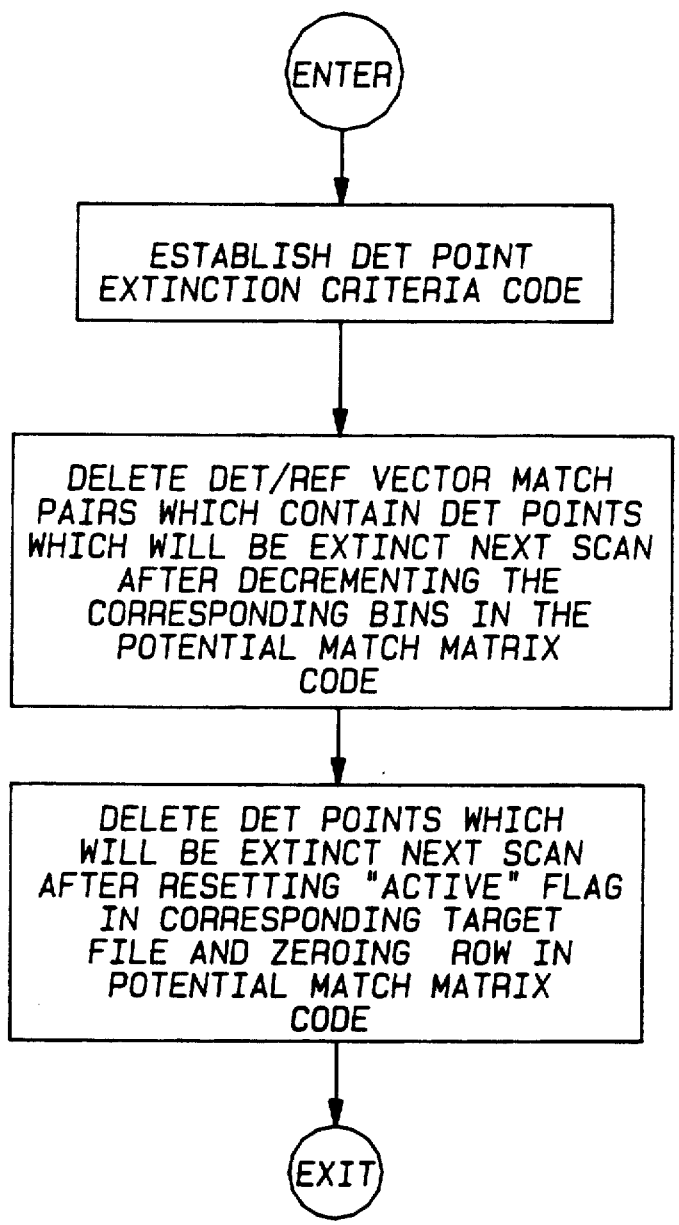
FIG. 12 is a flowchart of the update routine in accordance with the present invention.

Next, the match matrix 30 is scanned again and any bin count which falls below the established threshold has its corresponding bin in a new refined potential match matrix 38 shown in FIG. 6, set to $-1$ (all other bins are set to 0). This flags the matrix refinement process to exclude "weak" vector matches which would normally increment this bin. Thus, each of the bins in FIG. 4 having only a 1, do not meet the 1.5 retention threshold and are underlined. Likewise, in the vector match table 36 in FIG. 5, these matches are identified under the column labeled "drop".

The refined potential match matrix 38 is completed by scanning the list of current vector matches and incrementing the two corresponding bins only if neither bin to be incremented is currently negative. This eliminates the underlined bins in the match matrix 30 and may reduce the counts in other bins as well in the refined potential match matrix. It should be noted that the BIN'S do not get reduced directly. They do get reduced indirectly via the refinement process. Since 2 BIN'S are eliminated for each vector match that is eliminated, other BIN'S can be reduced also. Next, the refined potential match matrix 38 is scanned to determine the maximum value (MAX) contained. The maximum value for each row plus the sum of the row entries is also determined for this scan. The column index for the maximum bin in each row is then determined. If more than one entry is at the row maximum value, the column index is set to minus one.

Next, a list of "high confidence" point matches is generated from the revised potential point match matrix 38 based on the first criteria which applies from the selection below:

1. If any row in the matrix 38 has a single non-zero value and that value is equal to the matrix maximum (MAX) then select all such point matches in the matrix. There could be up to one of these per row.

2. If any row in the matrix 38 has only one value equal to the matrix maximum (MAX) then select all such point matches in the matrix. There could be up to one of these per row.

3. Select all point matches in the matrix 38 whose bin value is equal to the matrix maximum (MAX).

The appropriate preliminary REF to DET transformation calculations are performed at this point to prepare for the final point match selection process. Note that for now, a median offset vector (REF to DET) is established from the set derived from the high confidence point matches generated above. X and Y medians are determined separately. It will be appreciated that while the above coordinate transformation converted the reference points to the correct bearing angle of the detected point frame, there still will be an offset between the reference and detected points. For example, FIG. 7 shows that the high confidence matches (2, 2) (3, 3) and (6, 4) represented by the solid circled bins in the refined matrix 38 have their median offsets X, Y computed.

The final point matches are selected by transforming each potential REF match point to the DET frame using the preliminary transformations defined above. That is, the median offset vector is added to REF point coordinates to estimate their expected DET frame values. The corresponding DET match point is checked for spatial consistency (the length of the difference vector lies within a predetermined tolerance). The potential matches to be tested during this final path are those whose non-zero bin values are equal to their row maximums. A list of final point matches and a final match count is then generated. This process is illustrated in FIG. 8.

If the number of final point matches is insufficient, then the process terminates. Otherwise the reference pattern is said to be found and the process proceeds to the aimpoint location process described below.

The appropriate REF to DET transformation calculations are performed using the final point match pairs. A more sophisticated transformation is used at this stage to account for any minor perspective distortions and small differences in scale and rotation. The transformation is then used to locate the specific aimpoint in the DET image.

4. Update

Detected points which have become extinct (X coordinates less than predetermined minimum) must be eliminated. This is accomplished by decrementing the appropriate bins in the permanent potential match matrix which arose from the extinct point then, by removing the corresponding vectors which contain the extinct point as an end point from the vector match list of current detection points. Further, the rows of the matrix and the point and vector lists should be appropriately compressed. The actual compression may be by chain pointer modification. The vacated rows should contain all zeros.

FIGS. 9 through 12 are flowcharts of the above-described process. In particular, the Initialization period is summarized in the flowchart in FIG. 9. The Detection process is summarized in the flowchart in FIG. 10. The Matching Process is summarized in FIGS. 11a–11b and the Update Process is summarized in the flowchart in FIG. 12.

A simple aimpoint estimation logic example for the Constellation Matcher 14 will now be reviewed. This case assumes unknown translation and negligible rotation or scale factors on either axis. The estimated coordinates of the aimpoint are found by the following transformation, where the centroids for all final matched pairs are computed as follows:

$$\begin{bmatrix} \hat{x}_D \\ \hat{y}_D \end{bmatrix} = \begin{bmatrix} x_R \\ y_R \end{bmatrix} + \begin{bmatrix} x_D - x_R \\ y_D - y_R \end{bmatrix}$$

$$x_D = \frac{1}{N} \sum_{i=1}^{N} x_{Di}, \quad y_D = \frac{1}{N} \sum_{i=1}^{N} y_{Di},$$

$$x_R = \frac{1}{N} \sum_{i=1}^{N} x_{Ri}, \quad y_R = \frac{1}{N} \sum_{i=1}^{N} y_{Ri}$$

Note that the above case is simple but is very dependent on assumptions. A more complex but also more tolerant approach will now be reviewed. This is for the case of Unknown Translation, Potentially Very Small Rotation ($\leq 5°$), No Y Scale Factor, and Potentially Small X Scale Factor ($\leq 10$).

The problem is to equate $\begin{bmatrix} x' \\ y' \end{bmatrix}$ with $\begin{bmatrix} \cos\theta & -\sin\theta \\ \sin\theta & \cos\theta \end{bmatrix} \begin{bmatrix} x \\ y \end{bmatrix}$ where $\begin{bmatrix} x' \\ y' \end{bmatrix}$ is calculated from $\begin{bmatrix} 1/k_0 & 0 \\ 0 & 1 \end{bmatrix} \begin{bmatrix} x'' \\ y'' \end{bmatrix}$ and $\begin{bmatrix} x'' \\ y'' \end{bmatrix}$ is equal to $\begin{bmatrix} x_D \\ y_D \end{bmatrix} - \begin{bmatrix} x_D \\ y_D \end{bmatrix}$ Also, $\begin{bmatrix} x \\ y \end{bmatrix}$ is calculated from $\begin{bmatrix} x_R \\ y_R \end{bmatrix} - \begin{bmatrix} x_R \\ y_R \end{bmatrix}$ The following transformation is calculated in the following ten steps:

$$\begin{bmatrix} \hat{x}_D \\ \hat{y}_D \end{bmatrix} =$$

$$\begin{bmatrix} \hat{k} & 0 \\ 0 & 1 \end{bmatrix} \begin{bmatrix} \cos\hat{\theta} & -\sin\hat{\theta} \\ \sin\hat{\theta} & \cos\hat{\theta} \end{bmatrix} \begin{bmatrix} x_R - x_R \\ y_R - y_R \end{bmatrix} + \begin{bmatrix} x_D \\ y_D \end{bmatrix} \leftarrow \text{Transformation}$$

Compute $x_D = \frac{1}{N} \sum_{i=1}^{N} x_{Di}, \quad y_D = \frac{1}{N} \sum_{i=1}^{N} y_{Di}$ (1)

$x_R = \frac{1}{N} \sum_{i=1}^{N} x_{Ri}, \quad y_D = \frac{1}{N} \sum_{i=1}^{N} y_{Di}$ Compute $(x_i'', y_i'')$ for $i = 1, 2, \ldots, N$ by $\begin{cases} x_i'' = X_{Di} - x_D \\ y_i'' = y_{Di} - y_D \end{cases}$ (2)

Compute $(x_i, y_i)$ for $i = 1, 2, \ldots, N$ by $\begin{cases} x_i = X_{Ri} - x_R \\ y_i = y_{Ri} - y_R \end{cases}$ (3)

Compute $D'' = \sum_{i=1}^{N-1} \sum_{j=i+1}^{N} |x_i'' - x_j''|$ and (4)

$$D = \sum_{i=1}^{N-1} \sum_{j=i+1}^{N} |x_i - x_j|$$

Compute Initial Estimate of $K$ by $$\hat{K}_0 = \begin{cases} \frac{DD''\sigma_V^2 + N(N-1)\sigma_X^2 V^2}{D^2 \sigma_V^2 + N(N-1)\sigma_X^2 V^2} & \text{if } DEN \neq 0 \\ 1 & \text{otherwise} \end{cases}$$ (5)

Compute $(x_i', y_i')$ for $i = 1, 2, \ldots, N$ by $\begin{cases} x_i' = x_i''/\hat{K}_0 \\ y_i' = y_i'' \end{cases}$ (6)

Estimate $\theta$ by $$\theta = \left\{ \tan^{-1} \left[ \frac{\sum_{i=1}^{N} (x_i y_i' - y_i x_i')}{\sum_{i=1}^{N} (x_i x_i' + y_i y_i')} \right] \right\} \left( \frac{\sigma_\theta^2}{\sigma_\theta^2 + \sigma_{\hat{\theta}}^2} \right)$$ (7)

where $\sigma_{\hat{\theta}}^2 = \dfrac{\left(\sum_{i=1}^{N} x_i^2\right) \sigma_{y'}^2 + \left(\sum_{i=1}^{N} y_i^2\right) \sigma_{x'}^2}{\left[\sum_{i=1}^{N} (x_i^2 + y_i^2)\right]^2}$ and $\sigma_\theta^2$ is apriori variance.

Compute $(\hat{x}_i', \hat{y}_i')$ for $i = 1, 2, \ldots, N$ by $\begin{cases} \hat{x}_i' = x_i \cos\hat{\theta} - y_i \sin\hat{\theta} \\ \hat{v}_i' = x_i \sin\hat{\theta} + y_i \cos\hat{\theta} \end{cases}$ (8)

Compute $D' = \sum_{i=1}^{N-1} \sum_{j=i+1}^{N} |x_i' - x_j'|$ (9)

Re-estimate $K$ by $$\hat{K} = \begin{cases} \frac{D'D''\sigma_V^2 + N(N-1)\sigma_X^2 V^2}{(D')^2 \sigma_V^2 + N(N-1)\sigma_X^2 V^2} & \text{if } DEN \neq 0 \\ 1 & \text{otherwise} \end{cases}$$ (10)

It will be appreciated that a more generalized transformation may also be used. For example, a least squares fit estimate of a transformation matrix that includes rotation and scale and shift (as well as perspective) may be employed.

Real-Time Implementation Example

An example of one implementation of the present invention for real-time constellation matching will now be discussed. It will be appreciated that this example is easily implemented in software on conventional computers to achieve rapid solutions to the matching problem. Referring now to FIG. 13A, the example shows five reference points and two aimpoints. FIG. 13B shows the rotation of the coordinates by a bearing angle of 90° after rotation. FIG. 14 indicates the coordinates of the input reference point table upon rotation, the coordinates become the reference point table coordinates indicated in FIG. 15. Likewise, FIG. 16 indicates the reference aimpoint table and FIG. 17, the coordinates of the reference aimpoint table upon rotation by 90°.

All definitions for terms used in the real-time implementation example in FIGS. 13-27 inclusive are as follows.

| CONSTELLATION MATCHER DATA DEFINITION | |
|---|---|
| Input REF Point Table: | |
| NRPTS = | Number of REF points (3 ≤ NRPTS ≤ NREFMAX) |
| XRIN(I) = | X coordinate of Ith REF point (X = NORTH) |
| YRIN(I) = | Y coordinate of Ith REF point (Y = EAST) |
| Input REF Aimpoint Table: | |
| NAPS = | Number of Aimpoints (1 ≤ NAPS ≤ NAPMAX) |
| APIDX(I) = | Aimpoint designation index for Ith Aimpoint |
| | (Table prioritized from highest (at zero) to lowest) |
| APIDX = | $\begin{cases} \text{Reference point index; AP = REF point} \\ -1; \text{otherwise} \end{cases}$ |
| XAPIN(I) = | X coordinate of Ith Aimpoint (X = NORTH) |
| YAPIN(I) = | y coordinate of Ith Aimpoint (Y = EAST) |
| | Values for XAPIN and YAPIN are supplied only if APIDX = −1 |
| Input Parameter: (See FIG 13B.) | |
| BEARING = | Heading angle for encountering REF points (−180° ≤ BEARING < 180°; Angle relative to NORTH) 0° = NORTH, +90° = EAST, −90° = WEST, −180° = SOUTH |
| | $\theta$ = BEARING (from NORTH); ORIGIN arbitrary The Transformation from Input Frame to Apriori Internal REF Frame is given by |
| | $\begin{bmatrix} X_{REF} \\ Y_{REF} \end{bmatrix} = \begin{bmatrix} \cos\theta & \sin\theta \\ -\sin\theta & \cos\theta \end{bmatrix} \begin{bmatrix} X_{IN} \\ Y_{IN} \end{bmatrix}$ |
| Reference Point Table: 0 ≤ I < NRPTS | |
| XREF(I) = | X coordinate of Ith REF point |
| YREF(I) = | Y coordinate of Ith REF point |
| Reference Aimpoint Table: 0 ≤ I > NAPS | |

| CONSTELLATION MATCHER DATA DEFINITION | |
|---|---|
| XAPREF(I) = | X coordinate of Ith reference AP |
| YAPREF(I) = | Y coordinate of Ith reference AP |
| Reference Vector Table: 0 ≤ I < (NRPTS) * (NRPTS-1) | |
| NRVECT = | Number of retained REF vectors |
| RPVHEAD(I) = | Index of REF point used as Head of Ith REF |
| RPVTAIL(I) = | Index of REF point used as Tail of Ith REF vector |
| XRVECT(I) = | X component of Ith REF vector |
| YRVECT(I) = | Y component of Ith REF vector |

Vectors which have XRVECT<SVCUTOFF need not be retained in the table since they could never match a corresponding DET vector (HEAD=newest DET point; TAIL =Previous DET point)

| Quantization Pointer Table: 0 ≤ I < NQBINS Pointer Table contains pointer to start of list and length of list for each bin in the Matchable REF Vectors Table | |
|---|---|
| QTABPTR(I) = | Pointer to start of REF vector list for Ith quantization BIN |
| QTABLEN(I) = | Length of REF vector list for Ith quantization BIN |
| Matchable REF Vectors Table: 0 ≤ I < NMRVTAB | |
| NMRVTAB = | Number of entries in Matchable REF Vectors Table |
| RVPMIDX(I) = | REF vector potential match index for Ith table entry |

This table consists of consecutive lists of REF vector indices which could potentially match DET vectors falling in the corresponding quantization BIN. Lists for BINS are stacked contiguously in the table.

| Detection Points Linked List: 0 ≤ I < NDETMAX | |
|---|---|
| NDPTS = | Number of DET points (0 ≤ NDPTS < NDETMAX) |
| DPLBEG = | Table index for first entry in Detection Points Linked List |
| DPLEND = | Table index for last entry in Detection Points Linked List |
| DPLNEXT(I) = | Table index for next entry in Detection Points Linked List [−1 if last entry] |
| DPLPREV(I) = | Table index for previous entry in Detection Points Linked List [−1 if first entry] |
| DETTGT(I) = | Target File Index for DET point stored at table index I |
| XDET(I) = | X coordinate of DET point stored at table index I |
| YDET(I) = | Y coordinate of DET point stored at table index I |
| DET/REF Vector Match Linked List: 0 ≤ I NDRVMMAX | |
| NDRVMATS = | Number of entries in DET/REF Vector Match Linked List (Generate Error if # exceeds NDRVMMAX) |
| DRVLBEG = | Table index for first entry in DET/REF Vector Match Linked List |
| DRVLEND = | Table index for last entry in DET/REF Vector Match Linked List |
| DRVLNEXT(I) = | Table index for next entry in DET/REF Vector Match Linked List [−1 if last entry] |
| DRVLPREV(I) = | Table index for previous entry in DET/REF Vector Match Linked List [−1 if first entry] |
| BIDXHEAD(I) = | BIN index into Potential Match Matrix for DET/REF pair comprising the vector HEAD of the entry stored at the Table index I |
| BIDXTAIL(I) = | BIN index into Potential Match Matrix for DET/REF pair comprising the vector TAIL of the entry stored at the Table index I |
| Free Space Stack for Detection Point Linked List: | |

-continued

| | |
|---|---|
| DPLFREE(I) = | Index into Detection Points Linked List table (used if I < NDPTS; free if I ≥ NDPTS) |
| *Free Space Stack for DET/REF Vector Match Linked List:* | |
| DRVLFREE(I) = | Index into DET/REF Vector Match Linked List able (used if I < NDRVMATS; free if I ≥ NDRVMATS) |
| *Potential Match Matrix: 0 ≤ K < NMATBINS* | |
| MATBIN(K) = | Histogram Count of number of occurrences of the Kth DET/REF point pair in the DET/REF vector match list |
| *Refined Potential Match Matrix: 0 ≤ K < NMATBINS* | |
| RMATBIN(K) = | Histogram count of number of occurrences of the Kth DET/REF point pair in the refined DET/REF vector match list |
| *Ref to DET Offset Vectors Table: 0 ≤ I < NRDOFF* | |
| NRDOFF = | Number of REF to DET offset vectors resulting from potential high confidence matches |
| RDXOFF(I) = | Ith x offset (REF to DET) |
| RDYOFF(I) = | Ith y offset (REF to DET) |
| MEDXOFF = | Median x offset (REF to DET) |
| MEDYOFF = | Median y offset (REF to DET) |
| *Final Point Match Table: 0 ≤ I < NUMDMAT* | |
| NUMDMAT = | Number of final DET points matched |
| NUMRMAT = | Number of final REF Points matched |
| MDPIDX(I) = | DET point index (Target File Index) for Ith point match |
| MRPIDX(I) = | REF point index for Ith point match |
| MDPX(I) = | x coordinate of DET point in Ith point match |
| MDPY(I) = | y coordinate of DET point in Ith point match |
| *Estimated DET Frame Aimpoint Table: 0 ≤ I < NAPS* | |
| XAPDET(I) = | X coordinate of Ith reference AP |
| YAPDET(I) = | Y coordinate of Ith reference AP |
| *Variables:* | |
| FTDEST = | Estimated false target density (FTD) for DET points |
| MXTHRESH = | Maximum BIN value threshold for establishing potential DET/REF matches If BINMAX < MXTHRESH: No match |
| BRTHRESH = | BIN retention threshold for second matching pass Kth BIN retained if MATBIN(k) ≥ BRTHRESH |
| BINMAX = | Maximum count of all BINS in Potential Match Matrix |
| RBINMAX = | Maximum count of all BINS in Refined Potential Match Matrix |
| ROWMAX(I) = | Maximum count of all BINS in Ith ROW of Refined Potential Match Matrix |
| ROWSUM(I) = | Sum of all positive counts in all BINS in the Ith ROW of Refined Potential Match Matrix −1 BINS ignored |
| RMAXCOL(I) = | Column index for BIN containing Maximum Count for Ith ROW of Refined Potential Match Matrix Set to −1 if more than one BIN in ROW is at Max Value |
| MATHRESH = | Match threshold for final REF point matches |
| MINTHR = | Absolute minimum value allowed for match threshold |
| MATFLAG = | Match Flag (set if matched, reset otherwise) |
| XEXTINCT = | X value at beyond which old DET points become extinct and are deleted from further consideration in the matching process |
| CONSTANTS: | |
| NDETMAX = | Maximum number of DET points allowed |
| NREFMAX = | Maximum number of REF points allowed |
| NAPMAX = | Maximum number of REF aimpoints allowed |
| DETDEPTH = | Storage Depth for DET points (X) |
| DETWIDTH = | Storage Width for DET points (Y) |
| SCANSIZE = | Width of a single detection scan |
| XQSTEP = | REF vector quantization step size (X) |
| YQSTEP = | REF vector quantization step size (Y) |
| NQXSTEPS = | Number of quantization steps (in X) for |

-continued

| | |
|---|---|
| NQYSTEPS = | DET vector space<br>Number of quantization steps (in Y) for DET vector space |
| NQBINS = | Number of quantization BINS for DET vector space |
| VCUTOOF = | Minimum negative X component allowed for retention of REF vector (this must be at least as large as the detection scan width) |
| XDVQOFF = | DET vector quantization offset (X) = XVCUTOFF normally |
| YDVQOFF = | DET vector quantization offset (Y) = DETWIDTH normally |
| NMRVTMAX = | Maximum number of Matchable REF Vector Table entries |
| NDRVMMAX = | Maximum number of DET/REF Vector Match Table entries |
| VMERRLIM = | Limit on allowable error for matching DET and REF vectors ($\approx \sqrt{2}$ * PMERRLIM) |
| PMERRLIM = | Limit on allowable error for matching DET and REF points (combines point error and rotation error and velocity/scale error) |
| REGDIST = | Target Registration Distance (absolute minimum distance between two DET points) |
| NMATBINS = | Number of Potential Match Matrix BINS = (NDETMAX * NREFMAX) normally |
| PDEST = | Apriori probability of detection (PD) for REF points |
| KMTHR = | Thresholding constant used in determining MXTHRESH |
| KBRTHR = | Thresholding constant used in determining BRTHRESH |
| KLOWFTD = | FTD breakpoint constant in determining MATHRESH |
| MINTHRLO = | Low value for MINTHR |
| MINTHRHI = | High value for MINTHR |
| KMATHR = | Thresholding constant used in determining MATHRESH |
| Formulas: | |
| MXTHRESH = | MAX {2, KMXTHR * (PDEST * NRPTS - 1)} |
| BRTHRESH = | KBRTHR * BINMAX |
| BIDXHEAD = | NREFMAX * DETTGT (for head point) + RPVHEAD |
| BIDXTAIL = | NREFMAX * DETTGT (for tail point) + RPVTAIL |
| MINTHR = | MINTHRLO if FTDEST $\leq$ KLOWFTD<br>MINTHRHI if FTDEST KLOWFTD |
| MATHRESH = | MAX {KMATHR * NRPTS * PDEST,MINTHR} |
| XEXTINCT = | XMSL + XOP − DETDEPTH<br>(where XMSL + XOP is the x coordinate at center of DET scan) |

NOTE:
Need to define a CONST_MATCHER_DET_POINT_ACTIVE flag in each Target File (CMDPACT abbreviation). This flag is set when the target file is used as a DET point.
Need to define a DETPTR in each Target File to point to DET Point Index in Table
NDPTS is index of next unused entry in this table
NDRVMATS is index of next unused entry in this table
K = NREFMAX * I + J where I = DET point index and J = REF point index
2 BINS incremented for each vector match (one from HEADS, other from TAILS)
Value = Count if non-negative or exclusion flag if −1
Initially x/y pairs are aligned but then are sorted separately
This number is theoretically very large, but in practice will not be very large. Value chosen somewhat arbitrarily to cover most anticipated cases but should be set empirically unless memory is no problem.
ABSMAX = (NREFMAX) * (NREFMAX-1) * (NDETMAX) * (NDETMAX-1)/2

A Reference Vector Table is now created which contains all of the ordered pairs of reference points after eliminating those vectors having an XV less than XV cut-off where XV cut-off is equal to −75. In particular eight possible vectors were eliminated and 12 remain as shown in FIG. 19.

In this example, the storage depth for detection points (X) is DETDEPTH=900 for the Y axis DETWIDTH=1000 and the width of a single detect scan is SCANSIZE=75; XQSTEP=512, YQSTEP=512, NQXSTEPS=2 and NQYSTEPS=4. Also VMERRLIM=60, XDVQOFF=75 and YDVQOFF=1000.

Figure 18A:
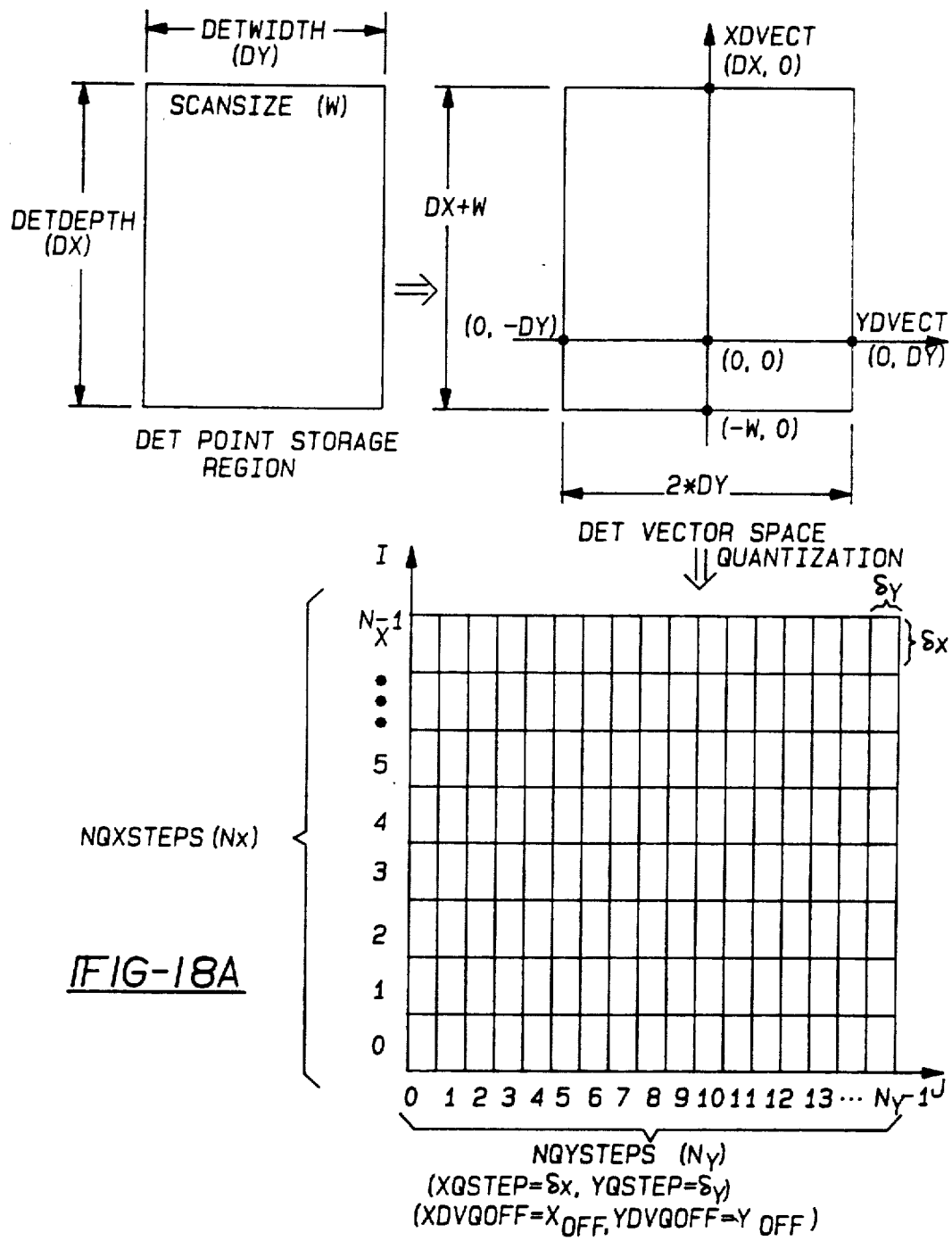

FIG. 18 contains the Detection Point/Vector/Quantization coordinate definition tables as well as the constraints used in this example. The quantization pointer table and matchable reference vectors table are shown in FIG. 20. The purpose of quantization is to speed-up throughput. If all possible vector matches were tried, the number of trials would get very large due to the combinatorics. Since there are really very few vectors that are close to matching, the process can be streamlined by using quantization. Thus, all combinations of the reference points are used to make reference vectors and then they are divided up into quantized bins. Then for each quantization bin, a list of indices for all REF vectors which could possible match any DET vector corresponding to that bin is stored in a table. When a detected vector is determined, it is quantized and the system then tries to match only those REF vectors whose indices were stored in the corresponding quantization bin. Thus, the system knows which ones are even close to matching and the system does not have to look at all of them. In essence, the quantization pointer table provides a way of looking things up quickly. If enough memory were reserved to handle all possible matches, it would consume a great deal of memory storage space.

Figure 25:
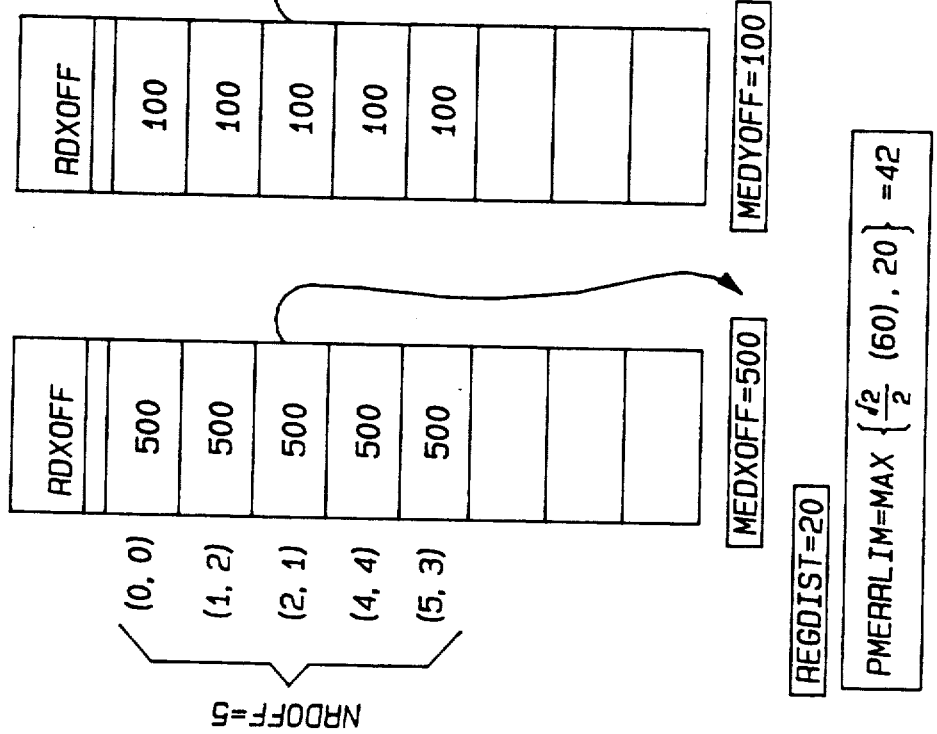
FIG. 25 shows refined potential match matrix row statistics and REF/DET offset vectors table in accordance with the present invention.

FIG. 21 shows the detection points linked list. FIG. 22 shows the DET/REF vector match linked list which is the set of all vector pairs that matched based on their difference vectors being small enough. FIG. 23 shows the potential match matrix where the bin MAX is 4, the MXTHRESH is 2.0625 and thus the BIN MAX is greater than the MXTHRESH. Also, the BRTHRESH=0.5x4 is equal to 2 thus, bins less than 2 are excluded to yield the refined potential match matrix shown in FIG. 24. FIG. 25 shows the refined potential match matrix row statistics which are used for active rows to determine where conflicts exist. FIG. 25 also shows the offset vector table. Finally, FIG. 26 is the final point match table indicating that five matches were found. To estimate the detection frame aimpoint coordinates in this simple case, the median REF to DET frame offsets are used. This yields the aimpoint coordinates shown in FIG. 27.

It should be recognized that the constellation matching system 10 can be used for matching a set of reference points with a second set of detected points in a wide variety of settings. Also, the present invention can be used in real-time in many applications. While the above description constitutes the preferred embodiments of the present invention, it will be appreciated that the invention is susceptible to modifications, variation and change without departing from the proper scope and fair meaning of the accompanying claims.

What is claimed is:

1. A constellation matcher for matching a set of detected points to a reference pattern, said system comprising:
    means for storing the coordinates of reference points from the reference pattern, said coordinates being defined in a reference coordinate frame;
    means for storing the coordinates of the detected points, said coordinates begin defined in a detected coordinate frame;
    means for transforming said points in said reference coordinate frame to said detected coordinate frame;
    means for creating a vector table of each possible ordered pair of reference points;
    means for creating a vector table of each possible ordered pair of detected pairs;
    means for creating a list of matched pairs of reference and detected vectors having a difference vector below a predetermined threshold;
    means for creating a match matrix histogram containing bins for counting matches between detected and reference points corresponding to said matched pairs of reference and detected vectors; and
    means for selecting matches in the matrix by eliminating less probable matches based on the number of counts in said bins.

2. The pattern matching system of claim 1, wherein said means for transforming performs a coordinate transformation that rotates the reference frame by an angle of bearing.

3. The pattern matching system of claim 1, further comprising:
    means for determining if the count in a bin is below a predetermined match threshold, said predetermined match threshold being calculated based on a number of reference points and the probability of point detection;
    means for determining if the number of counts in a bin are less than a retention threshold, said retention threshold being proportional to said match threshold; and
    means for eliminating matches in bins falling below said retention threshold.

4. The pattern matching system of claim 1, further comprising means for determining if there are row conflicts in said match matrix histogram and for selecting high confidence matches based on the relative absence of such conflicts.

5. The pattern matching system of claim 4, further comprising means for calculating the offset of reference and detected points in said high confidence matches and means for creating a final matched table by eliminating matched points having relatively high offsets.

6. The pattern matching system of claim 1, further comprising means for defining a particular point in said reference pattern, and means for locating a corresponding point in said detected pattern located in the same relative position with respect to the detected pattern.

7. A method for matching a set of detected points to a reference point pattern, said method comprising:
    (a) storing the coordinates of reference points from the reference pattern, said coordinates being defined in a reference coordinate frame;
    (b) storing the coordinates of the detected points, said coordinates being defined in a detected coordinate frame;
    (c) transforming said points in said reference coordinate frame to said detected coordinate frame;
    (d) creating a vector table for each possible ordered pair of reference points;
    (e) creating a vector table for each possible ordered pair of detected points;

8. The method of claim 7, wherein said steps a, c, d, are performed in an initialization step, and steps b, e, f, g, and h are performed for each new detected point.

9. The method of claim 1, wherein said step of transforming further comprises steps of performing a coordinate transform that rotates the reference frame by an angle of bearing.

10. The method of claim 7, further comprising: determining if the count in a matrix are below a predetermined match threshold, said predetermined match threshold being calculated based on the number of reference points and a probability of point detection;
    determining if the number of counts in a bin are less than a retention threshold, said retention threshold being proportional to said match threshold; and
    eliminating matches in bins falling below said retention threshold 11. The method of claim 7, further comprising means for determining if there are row conflicts in said match matrix histogram and for selecting high confidence matches based on the absence of such conflicts.

12. The method of claim 11, further comprising the step of calculating the offsets of reference and detected points in said high confidence matches and creating a final match table by eliminating matched points having relatively high offsets.

13. The method of claim 7, further comprising defining a particular point in said reference pattern and locating corresponding point in said detected pattern located in the same relative position with respect to the detected pattern.

14. A pattern matching system for matching a set of detected points to a reference point pattern, said system comprising:
- means for storing the coordinates of reference points from the reference pattern, said coordinates being defined in a reference coordinate frame;
- means for storing the coordinates of the detected points, said coordinates being defined in a detected coordinate frame;
- means for transforming said points in said reference coordinate frame to said detected coordinate frame;
- means for creating a vector table for each possible ordered pair of reference points;
- means for creating a vector table for each possible ordered pair of detected points.
- means for creating a list of pairs of matched reference and detected vectors having a difference vector below a predetermined threshold;
- means for creating a match matrix histogram containing bins for counting matches between detected and reference points corresponding to said matched pairs of referenced and detected vectors; and
- means for selecting matches in the matrix by eliminating less probable matches based on the number of counts in said bins.

15. A pattern matching system for missile guidance capable of matching a set of detected points to a reference point pattern, said system comprising:
- means for storing the coordinates of reference points from the reference pattern, said coordinates being defined in a reference coordinate frame;
- means for storing the coordinates of the detected points, said coordinates being defined in a detected coordinate frame;
- means for transforming said points in said reference coordinate frame to said detected coordinate frame;
- means for creating a vector able for each possible ordered a pair of reference points;
- means for creating a vector table for each possible ordered pair of detected points;
- means for creating a list of pairs of matched reference and detected vectors having a difference vector below a predetermined threshold;
- means for creating a match matrix histogram containing bins for counting matches between detected and reference points corresponding to said matched pairs of reference and detected vectors;
- means for selecting matches in the matrix by eliminating less probable matches based on the number of counts in said bins; and
- means for controlling said missile based on the matching of said detected points to said reference points.

* * * * *